US011287383B2

(12) United States Patent
Dholakia et al.

(10) Patent No.: US 11,287,383 B2
(45) Date of Patent: Mar. 29, 2022

(54) OPTICAL RAMAN SYSTEM

(71) Applicant: UNIVERSITY COURT OF THE UNIVERSITY OF ST ANDREWS, St Andrews (GB)

(72) Inventors: Kishan Dholakia, St Andrews (GB); Mingzhou Chen, St Andrews (GB)

(73) Assignee: UNIVERSITY COURT OF THE UNIVERSITY OF ST ANDREWS, St Andrews (GB)

(*) Notice: Subject to any disclaimer, the term of this patent is extended or adjusted under 35 U.S.C. 154(b) by 63 days.

(21) Appl. No.: 16/333,192

(22) PCT Filed: Sep. 13, 2017

(86) PCT No.: PCT/GB2017/052688
§ 371 (c)(1),
(2) Date: Mar. 13, 2019

(87) PCT Pub. No.: WO2018/051077
PCT Pub. Date: Mar. 22, 2018

(65) Prior Publication Data
US 2019/0242752 A1    Aug. 8, 2019

(30) Foreign Application Priority Data
Sep. 14, 2016 (GB) ...................... 1615612

(51) Int. Cl.
*G01N 21/65* (2006.01)
*G01J 3/02* (2006.01)
*G01J 3/44* (2006.01)

(52) U.S. Cl.
CPC ............ *G01N 21/65* (2013.01); *G01J 3/0218* (2013.01); *G01J 3/0262* (2013.01); *G01J 3/0272* (2013.01);
(Continued)

(58) Field of Classification Search
CPC .......... G01J 3/0262; G01J 3/44; G01J 3/4412; G01N 21/65
See application file for complete search history.

(56) References Cited

U.S. PATENT DOCUMENTS 6,545,755 B1    4/2003 Ishihama et al.
7,564,547 B2 *  7/2009 Yoo ........................... G01J 3/02
                                                    356/301
(Continued)

OTHER PUBLICATIONS

University Court of the University of St Andrews, International Application No. PCT/GB2017/052688, International Preliminary Report on Patentability, dated Mar. 28, 2019.
(Continued)

*Primary Examiner* — Violeta A Prieto
(74) *Attorney, Agent, or Firm* — Moore & Van Allen PLLC; W. Kevin Ransom

(57) ABSTRACT

A Raman system for use in performing Raman spectroscopy on a sample, comprises an optical source, a spectrometer, and an optical system for coupling light from the optical source to a sample and for coupling light from the sample to the spectrometer and a further spectrometer. A Raman system for use in performing Raman spectroscopy on a sample, comprises an optical source, a spectrometer and an optical system for coupling light from the optical source and a further optical source to a sample and for coupling light from the sample to the spectrometer. The optical system may be configured for coupling light from the optical source and the further optical source to the sample and for coupling light from the sample to the spectrometer and the further spectrometer. The Raman system may be portable and/or may be configured to be transported and/or carried and/or may be handheld.

24 Claims, 8 Drawing Sheets

(52) U.S. Cl.
CPC ............... *G01J 3/44* (2013.01); *G01J 3/4406* (2013.01); *G01J 3/4412* (2013.01); *G01N 2021/651* (2013.01)

(56) References Cited

U.S. PATENT DOCUMENTS

| | | | |
|---|---|---|---|
| 7,651,851 B2* | 1/2010 | Clarke | G01N 21/65 435/287.1 |
| 11,067,512 B1* | 7/2021 | Charache | G01N 21/65 |
| 2004/0160601 A1 | 8/2004 | Womble et al. | |
| 2006/0240401 A1* | 10/2006 | Clarke | A61B 5/14532 435/4 |
| 2007/0070343 A1 | 3/2007 | Cohen et al. | |
| 2007/0103679 A1* | 5/2007 | Yoo | G01J 3/36 356/301 |
| 2007/0103682 A1 | 5/2007 | Yoo | |
| 2008/0088837 A1 | 4/2008 | Gardner | |
| 2010/0315629 A1* | 12/2010 | Knopp | G01N 21/4738 356/301 |
| 2014/0268129 A1 | 9/2014 | Djeu | |
| 2015/0036135 A1* | 2/2015 | Knopp | G01J 3/42 356/301 |
| 2018/0003936 A1* | 1/2018 | Okamoto | G02B 21/008 |
| 2018/0031472 A1* | 2/2018 | Hammond | C12Q 1/06 |
| 2019/0242752 A1* | 8/2019 | Dholakia | G01J 3/4406 |

OTHER PUBLICATIONS

International Search Report for International Patent Application No. PCT/GB2017/052668 dated Feb. 19, 2018.
Written Opinion of the International Searching Authority for International Patent Application No. PCT/GB2017/052668 dated Feb. 19, 2018.

* cited by examiner

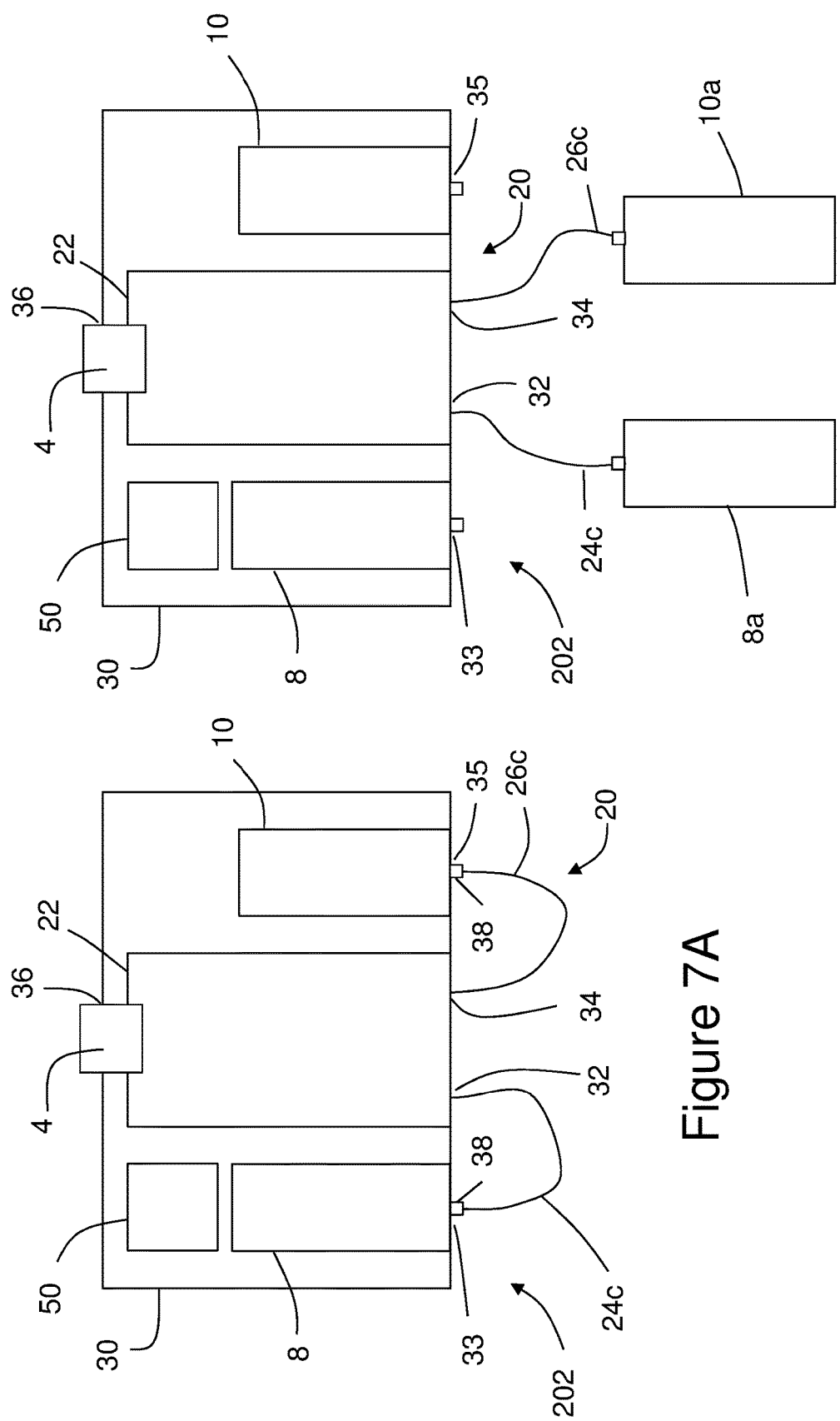

OPTICAL RAMAN SYSTEM

CROSS-REFERENCE TO RELATED APPLICATION(S)

This application is a national stage application (filed under 35 § U.S.C. 371) of PCT/GB2017/052688, filed Sep. 13, 2017 of the same title, which, in turn claims priority to Great Britain Application No. 1615612.7 filed Sep. 14, 2016 of the same title; the contents of each of which are hereby incorporated by reference.

FIELD OF THE INVENTION

A present disclosure relates to a Raman system for use in performing Raman spectroscopy on a sample and, in particular, though not exclusively to a Raman system which is portable, which is configured to be transported and/or carried, and/or which is configured to be handheld. The present disclosure also relates to a vial for use, in particular though not exclusively, for holding a sample for Raman spectroscopy.

BACKGROUND OF THE INVENTION

Optical Raman systems are known which are sufficiently portable to be carried or otherwise transported to a point of use. However, such optical Raman systems may be inaccurate or unreliable for some technical applications. Moreover, such optical Raman systems may only allow Raman measurements to be performed with a fixed sample configuration.

Vials are known for use in holding samples during Raman and other optical measurements. However, known vials may require a relatively large sample volume.

SUMMARY OF THE INVENTION

It should be understood that any one or more of the features of any of the following aspects or embodiments may be combined with any one or more of the features of any of the other aspects or embodiments.

According to at least one aspect or to at least one embodiment there is provided a Raman system for use in performing Raman spectroscopy on a sample, the Raman system comprising:
an optical source;
a spectrometer; and
an optical system for coupling light from the optical source to the sample and for coupling light from the sample to the spectrometer and a further spectrometer.

According to at least one aspect or to at least one embodiment there is provided a Raman system for use in performing Raman spectroscopy on a sample, the Raman system comprising:
an optical source;
a spectrometer; and
an optical system for coupling light from the optical source and a further optical source to the sample and for coupling light from the sample to the spectrometer.

According to at least one aspect or to at least one embodiment there is provided a Raman system for use in performing Raman spectroscopy on a sample, the Raman system comprising:
an optical source;
a spectrometer; and
an optical system for coupling light from the optical source and a further optical source to the sample and for coupling light from the sample to the spectrometer and a further spectrometer.

The Raman system may be compact. The Raman system may be portable. For example, the Raman system may be configured to be carried or otherwise transported by a user. The Raman system may be handheld.

The optical source may comprise a laser source. The optical source may comprise a laser diode. The optical source may operate in the near infra-red. The optical source may operate at a wavelength at or around 785 nm or at a wavelength at or around 830 nm. The optical source may be operated CW. The optical source may be capable of delivering optical power levels of up to a few hundred mW. The optical source may be capable of delivering optical powers of the order of 1-10 mW for optical trapping and of delivering optical powers of the order of 100 mW or more for Raman measurements. The optical source may be capable of delivering optical powers of the order of 100 mW or more for time periods of the order of 1-2 s for Raman measurements. The optical source may be tuneable. The optical source may be configured for modulation of the wavelength of the light delivered from the optical source. Tuning or modulating the wavelength of the light delivered from the optical source may permit the measurement of different Raman spectra for different excitation wavelengths. The different excitation wavelengths may differ by up to 1 nm or more. The different Raman spectra may be post-processed so as to remove background fluorescence.

The spectrometer may consist only of stationary parts. The spectrometer may comprise a dispersive element. The spectrometer may comprise a diffraction grating and/or a prism. The spectrometer may comprise an image sensor.

Such a Raman system may enable a further optical source to be optically coupled to the sample instead of, or in addition to, the optical source. The further optical source may be external to the Raman system. The further optical source may, for example, be larger and less portable than the optical source. The further optical source may be more powerful than the optical source. The further optical source may be capable of delivering a beam with a superior spatial profile to a spatial profile of a beam delivered by the optical source. The further optical source may have a lower linewidth than the optical source. The further optical source may comprise a laser. The further optical source may be tuneable. The further optical source may be configured for modulation of the wavelength of the light delivered from the further optical source. Tuning or modulating the wavelength of the light delivered from the further optical source may permit the measurement of different Raman spectra for different excitation wavelengths. The different excitation wavelengths may differ by up to 1 nm or more. The different Raman spectra may be post-processed so as to remove background fluorescence. The further optical source may comprise a laboratory laser instrument. The further optical source may comprise a titanium-sapphire (Ti:sapphire) laser. The further optical source may be capable of generating green light. The further optical source may be selected according to the technical application or the intended field of use.

Similarly, such a Raman system enables a further spectrometer to be optically coupled to the sample instead of, or in addition to, the spectrometer. The further spectrometer may be external to the Raman system. The further spectrometer may, for example, be larger and less portable than the spectrometer. The further spectrometer may have a higher resolution than the spectrometer. The further spectrometer may be more sensitive than the spectrometer. The further spectrometer may comprise at least one of a moveable dispersive element, a tuneable filter and a tuneable Fabry-Perot cavity. The further spectrometer may comprise at least one of a photomultiplier tube, a photon counter, and an avalanche photodiode. The further spectrometer may comprise a monochromator. The further spectrometer may be selected according to the technical application or the intended field of use.

The Raman system may comprise a housing. The housing may define an aperture for receiving the sample. The housing may define one or more windows for coupling light to and from the sample.

The optical system may be configured to couple light from the sample to the spectrometer and the further spectrometer at different times.

The optical system may be configured to couple light from the sample to the spectrometer and the further spectrometer at the same time.

The Raman system may comprise an output optical port.

The output optical port may allow light to leave the housing.

The optical system may optically couple the sample to the output optical port. The optical system may optically couple the output optical port to the spectrometer and the further spectrometer.

The optical system may optically couple the output optical port to the spectrometer and the further spectrometer at different times.

The optical system may optically couple the output optical port to the spectrometer and the further spectrometer at the same time.

The optical system may comprise one or more optical elements for optically coupling the sample to the output optical port. For example, the optical system may comprise at least one of a bulk optical element, an optical fiber element and an integrated optical element for optically coupling the sample to the output optical port.

The optical system may comprise an output optical fiber for optically coupling the output optical port to the spectrometer and/or for optically coupling the output optical port to the further spectrometer.

The output optical fiber may have a connector for connection of the output optical fiber at the output optical port. The connector may be configured for connection of the output optical fiber to the housing at the output optical port.

The optical system may comprise an output optical switch having an optical switch input port, a first optical switch output port, and a second optical switch output port. The sample may be optically coupled to the optical switch input port. The first optical switch output port may be optically coupled to the spectrometer. The second optical switch output port may be optically coupled to the further spectrometer. The output optical switch may comprise one or more bulk optical elements. The output optical switch may comprise one or more optical fibers. For example, the optical switch input port, the first optical switch output port, and the second optical switch output port may each comprise or may each be defined by optical fibers.

The optical system may comprise an output optical coupler having an optical coupler input port, a first optical coupler output port, and a second optical coupler output port. The sample may be optically coupled to the optical coupler input port. The first optical coupler output port may be optically coupled to the spectrometer. The second optical coupler output port may be optically coupled to the further spectrometer. The output optical coupler may comprise one or more bulk optical elements. The output optical coupler may comprise a beam splitter. The output optical coupler may comprise one or more optical fibers. For example, the optical coupler input port, the first optical coupler output port, and the second optical coupler output port may each comprise or may each be defined by optical fibers.

The optical system may be configured to couple light from the optical source and the further optical source to the sample at different times.

The optical system may be configured to couple light from the optical source and the further optical source to the sample at the same time.

The Raman system may comprise an input optical port.

The input optical port may allow light to enter the housing.

The optical system may optically couple the optical source and the further optical source to the input optical port. The optical system may optically couple the input optical port to the sample.

The optical system may optically couple the optical source and the further optical source to the input optical port at different times.

The optical system may optically couple the optical source and the further optical source to the input optical port at the same time.

The optical system may comprise one or more optical elements for optically coupling the input optical port to the sample. For example, the optical system may comprise at least one of a bulk optical element, an optical fiber element and an integrated optical element for optically coupling the input optical port to the sample.

The optical system may comprise an input optical fiber for optically coupling the optical source to the input optical port and/or for optically coupling the further optical source to the input optical port.

The input optical fiber may have a connector for connection of the input optical fiber at the input optical port. The connector may be configured for connection of the input optical fiber to the housing at the input optical port.

The optical system may comprise an input optical switch having a first optical switch input port, a second optical switch input port and an optical switch output port. The optical source may be optically coupled to the first optical switch input port. The further optical source may be optically coupled to the second optical switch input port. The optical switch output port may be optically coupled to the sample. The input optical switch may comprise one or more bulk optical elements. The input optical switch may comprise one or more optical fibers. For example, the first optical switch input port, the second optical switch input port and the optical switch output port may each comprise or may each be defined by optical fibers.

The optical system may comprise an input optical coupler having a first optical coupler input port, a second optical coupler input port and an optical coupler output port. The optical source may be optically coupled to the first optical coupler input port. The further optical source may be optically coupled to the second optical coupler input port. The optical coupler output port may be optically coupled to the sample. The input optical coupler may comprise one or more bulk optical elements. The input optical coupler may comprise a beam combiner. The input optical coupler may comprise one or more optical fibers. For example, the first optical coupler input port, the second optical coupler input port and the optical coupler output port may each comprise or may each be defined by optical fibers.

The optical system may comprise a further output optical port optically coupled to the optical source. The input optical fiber may have a connector for connection of the input optical fiber at the further output optical port. The connector may be configured for connection of the input optical fiber to the housing at the further output optical port.

The optical system may comprise a further input optical port optically coupled to the spectrometer. The output optical fiber may have a connector for connection of the output optical fiber at the further input optical port. The connector may be configured for connection of the output optical fiber to the housing at the further input optical port.

The input optical fiber may comprise a single-mode fiber (SMF) or a multi-mode fiber (MMF).

The output optical fiber may comprise a multi-mode fiber (MMF).

The input optical port may allow connection of optical fiber connectors of any kind. The input optical port may allow connection of at least one of SMA, FC, ST and an LC optical fiber connectors. The output optical port may allow connection of optical fiber connectors of any kind. The output optical port may allow connection of at least one of SMA, FC, ST and an LC optical fiber connectors.

The optical system may comprise an objective lens for coupling light to the sample and for coupling Raman scattered light emitted from the sample.

The objective lens may comprise a Fresnel lens.

The objective lens may comprise a high numerical aperture aspherical lens.

The objective lens may comprise a microscope objective.

The Raman system may comprise a sample holder for holding the sample.

The sample holder may comprise a vial.

The sample holder may comprise one or more microscope slides.

The Raman system may comprise a sample holder assembly for holding the sample holder relative to the optical system.

The sample holder assembly may be detachably attachable to the optical system. This may permit one sample holder assembly to be easily interchanged with a another sample holder assembly according to the type of sample holder used.

The sample holder assembly may comprise a Z-axis translation stage for adjusting a separation between the sample holder and the objective lens.

The sample holder assembly may comprise at least one of an X-axis translation stage and a Y-axis translation stage for adjusting a lateral alignment between the sample holder and the objective lens.

The Raman system may comprise a lamp for illuminating the sample.

The Raman system may comprise an image sensor for capturing an image of the sample, for example, when illuminated by the lamp.

The optical system may be configured to image the sample onto the image sensor.

The image sensor may comprise a charge coupled device (CCD) image sensor or a complementary metal oxide semiconductor (CMOS) image sensor.

The Raman system may comprise a temperature sensor for sensing a temperature of the sample.

The Raman system may comprise a controller configured for communication with the optical source and/or the spectrometer.

The controller may be configured to control the operation of the optical source and/or the spectrometer.

The controller may be configured to receive measured Raman spectral data from the spectrometer.

The controller may comprise a memory which stores Raman spectral data for a range of known substances.

The controller may comprise a processor for comparing the stored Raman spectral data with the measured Raman spectral data received from the spectrometer.

The processor may be configured to determine information relating to the composition of the sample based on the results of the comparison.

The controller may comprise a user interface for receiving instructions from a user and/or displaying information to a user.

The user interface may be configured to display the measured Raman spectral data to the user.

The user interface may be configured to display the determined information relating to the composition of the sample to the user.

According to at least one aspect or to at least one embodiment there is provided a vial for holding a sample, the vial comprising an outer body and an inner receptacle for receiving the sample, wherein the inner receptacle is defined within the outer body.

Such a vial may permit a measurement such as an optical Raman measurement to be performed on a smaller volume of fluid whilst retaining a standard vial form-factor.

The outer body may have a fixed geometry.

The geometry of the inner receptacle may be configured according to a geometry and/or volume of the sample, subject to the constraints imposed by the fixed geometry of the outer body.

The fixed geometry of the outer body may be selected according to a standard vial form-factor.

The outer body may have a fluid capacity of 2 ml.

The fluid capacity of the inner receptacle may be less than or equal to 1 ml, less than or equal to 200 µl, less than or equal to 100 µl, less than or equal to 50 µl or less than or equal to 20 µl.

The fluid capacity of the inner receptacle may be substantially equal to 100 µl.

The outer body and the inner receptacle may be unitary.

The outer body and the inner receptacle may be formed integrally.

The outer body and the inner receptacle may be transparent to at least one of UV light, visible light, and infrared light including light in the near-, mid- and far-infrared regions of the electromagnetic spectrum.

The vial may comprise a lid.

The lid may seal only the inner receptacle.

The lid may seal the inner receptacle and the outer body.

The lid may be detachably attachable to the outer body and/or to the inner receptacle.

The outer body may define at least one opening at one or at both ends thereof.

BRIEF DESCRIPTION OF THE DRAWINGS

Systems and methods for use in performing Raman spectroscopy on a sample and a vial will now be described by way of non-limiting example only with reference to the drawings of which:

FIG. 7A shows a second alternative Raman system for performing Raman spectroscopy on a sample when the Raman system is configured to use an internal optical source and an internal spectrometer;

FIG. 7B shows the second alternative Raman system of FIG. 7A when the Raman system is configured to use an external optical source and an external spectrometer;

DETAILED DESCRIPTION OF THE DRAWINGS

Figure 1:
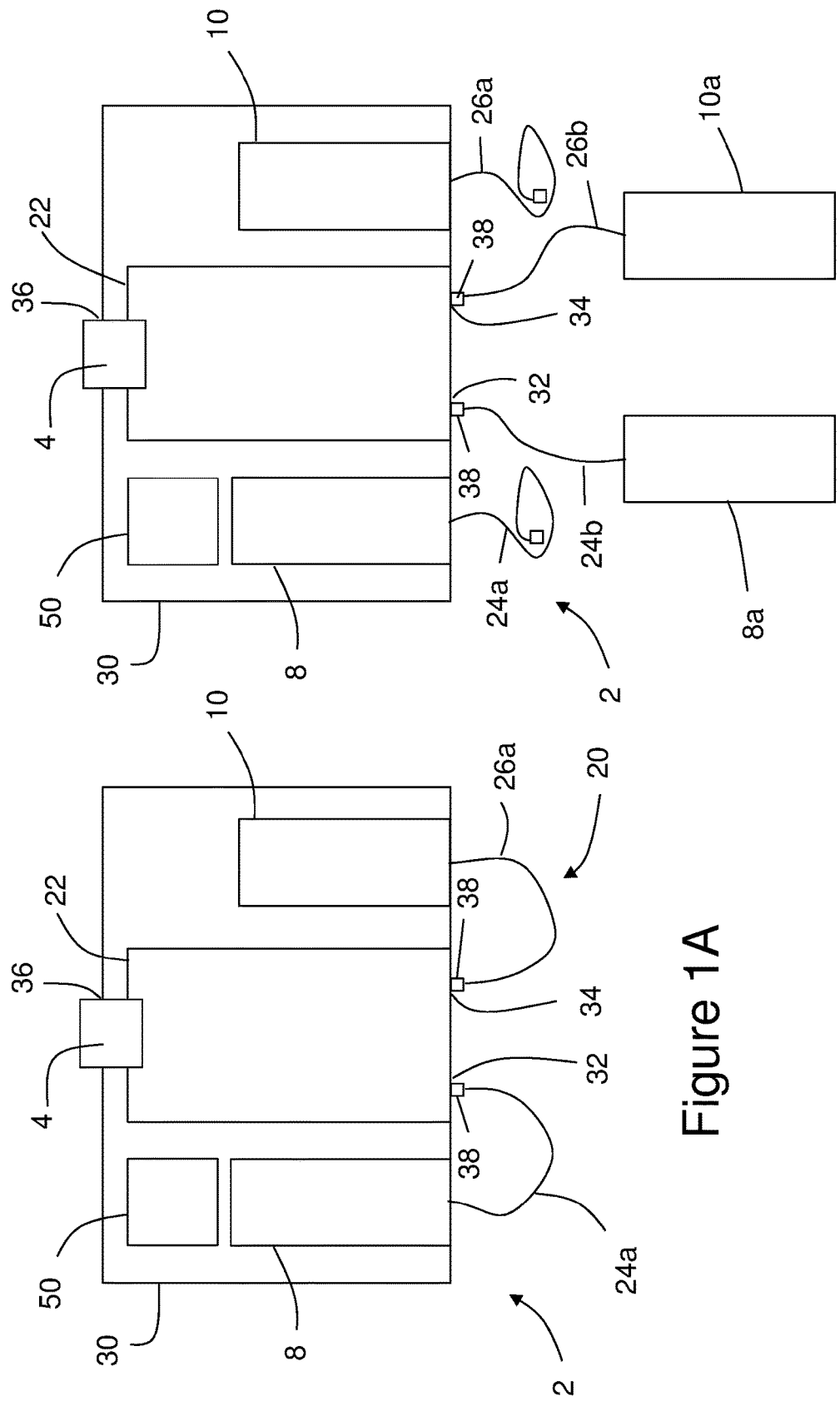
FIG. 1A shows a Raman system for performing Raman spectroscopy on a sample when the Raman system is configured to use an internal optical source and an internal spectrometer.
FIG. 1B shows the Raman system of FIG. 1A when the Raman system is configured to use an external optical source and an external spectrometer.

Referring initially to FIG. 1A, there is shown a compact, portable Raman system generally designated 2 for performing Raman spectroscopy on a sample in the form of a liquid sample 4. The Raman system 2 is configured to be carried or otherwise transported by a user. The Raman system 2 may be handheld. The Raman system 2 includes an optical source in the form of a compact 785 nm laser diode 8 and a spectrometer in the form of a compact spectrometer 10. The Raman system 2 includes an optical system generally designated 20 for coupling light from the laser diode 8 to the sample 4 and for coupling light from the sample 4 to the spectrometer 10. The Raman system 2 further includes a housing 30, an input optical port 32 for allowing light to enter the housing 30, and an output optical port 34 for allowing light to leave the housing 30. In addition, the housing defines an aperture 36 for receiving the sample 4.

As will be described in more detail below, the optical system 20 includes an arrangement 22 of optical elements for coupling light from the input optical port 32 to the sample 4 and for coupling light from the sample 4 to the output optical port 34.

The optical system 20 includes an input optical fiber 24a for coupling light from the laser diode 8 to the input optical port 32. The input optical fiber 24a includes an SMA optical fiber connector 38 for connection of the input optical fiber 24a to the input optical port 32.

The optical system 20 includes an output optical fiber 26a for coupling light from the output optical port 34 to the spectrometer 10. The output optical fiber 26a includes an SMA optical fiber connector 38 for connection of the output optical fiber 26a to the output optical port 34.

The Raman system 2 further includes a controller 50. The laser diode 8 and the spectrometer 10 are configured for communication with the controller 50. The controller 50 is configured to control the operation of the laser diode 8 and/or the spectrometer 10.

Figure 2:
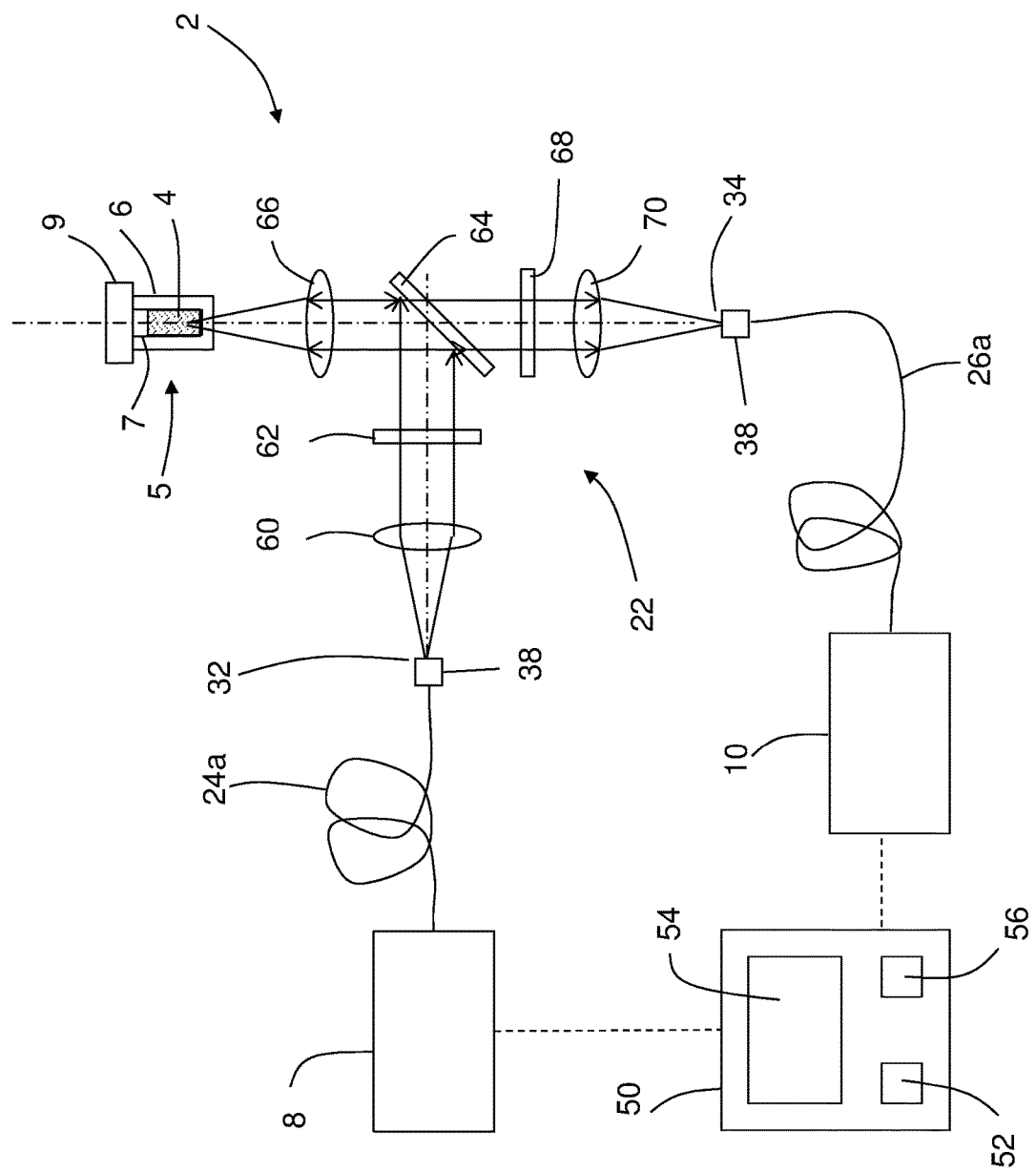
FIG. 2 schematically illustrates the Raman system of FIG. 1A in greater detail.

FIG. 2 schematically illustrates the Raman system 2 in more detail. The sample 4 is held in a sample holder in the form of a vial 5. The controller 50 includes a processor 52 for processing the measured spectral data received from the spectrometer 10. The controller 50 includes a user interface 54 for receiving instructions from a user and/or for displaying information to a user. The controller 50 may also include a memory 56 which may store spectral data such as Raman spectral data or fluorescence spectral data for a range of known substances.

The optical element arrangement 22 includes a collimating lens 60 for collimating light received from the input optical fiber 24a, a laser line filter 62 for transmitting at 785 nm, a dichroic edge filter 64 configured to reflect at 785 nm, an objective lens 66 for focusing light onto the sample 4 and for collecting light from the sample 4, a notch filter 68 for blocking 785 nm and a focusing lens 70 for focusing a collimated beam into the output optical fiber 26a.

In use, the laser diode 8 is operated CW so as to deliver optical power levels of the order of 100 mW at 785 nm to the sample 4 for time periods of the order of 1-2 s. Light from the laser diode 8 is coupled through the input optical fiber 24a and the optical element arrangement 22 into the sample 4. The objective lens 66 collects light from the sample 4. One of ordinary skill in the art will understand that the light collected from sample 4 may include at least one of Raman scattered light, background fluorescence and Rayleigh scattered light and that the dichroic edge filter 64 and the notch filter 68 reject the Rayleigh scattered light whilst transmitting the Raman scattered light and the background fluorescence collected from the sample 4. The focusing lens 70 focuses the collected Raman scattered light and the collected background fluorescence into the output optical fiber 26a which guides the collected Raman scattered light and the collected background fluorescence to the spectrometer 10.

The spectrometer 10 measures the optical spectrum of the collected Raman scattered light and the collected background fluorescence and provides the measured spectral data to the controller 50. The user interface 54 displays the measured spectral data to a user. The processor 52 may also compare Raman spectral data and/or fluorescence spectral data stored in the memory 56 with the measured spectral data received from the spectrometer 10 and determine information relating to the composition of the sample 4 based on the results of the comparison. The user interface 54 may also display the determined information relating to the composition of the sample 4 to the user.

Figure 3:
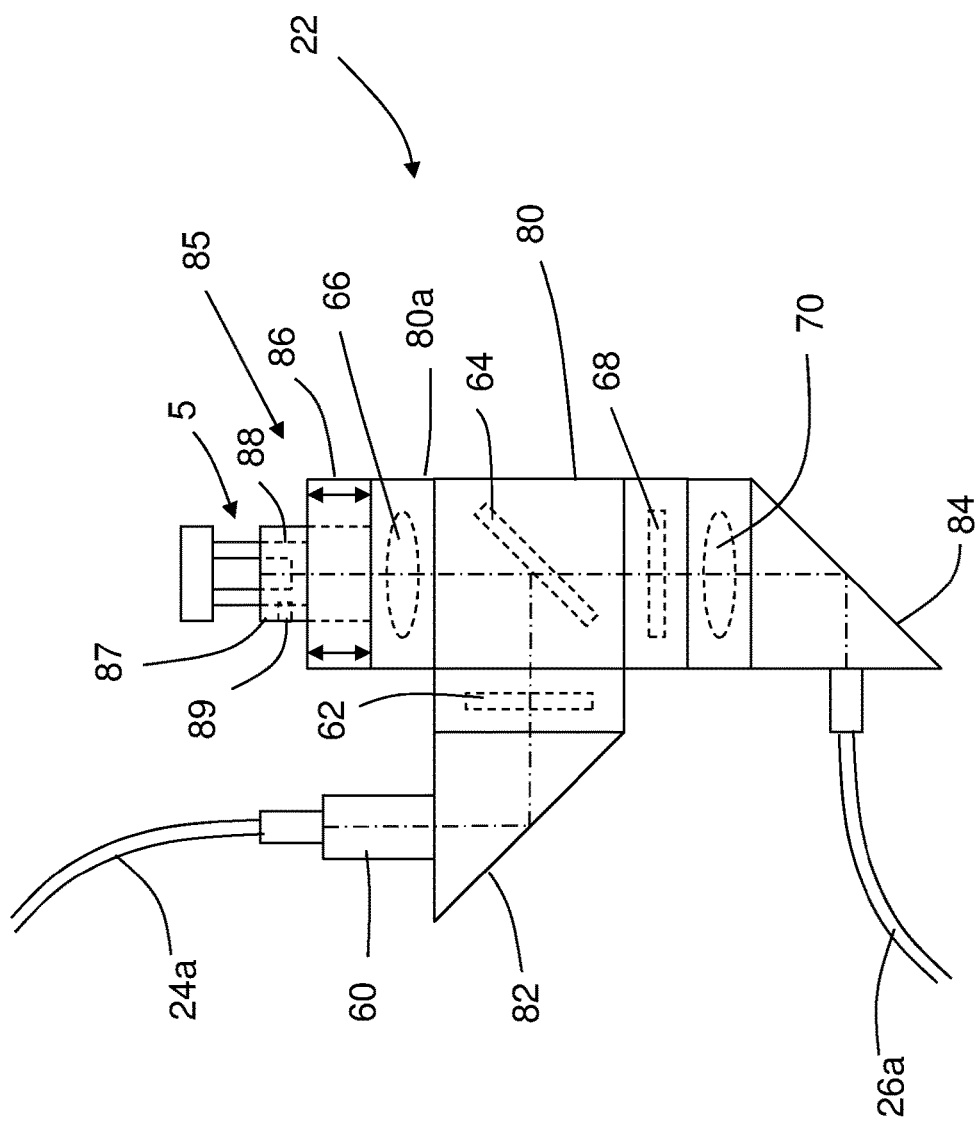
FIG. 3 shows a physical arrangement of part of an optical system of the Raman system of FIG. 2.

One of ordinary skill in the art will appreciate that the optical element arrangement 22 is represented in a functional schematic manner in FIG. 2 and that, in reality, the actual appearance and the physical arrangement of the optical components of the optical element arrangement 22 may be different to those shown in FIG. 2. FIG. 3 provides a more accurate representation of the actual physical arrangement of the optical components of the optical element arrangement 22. As shown in FIG. 3, all of the optical components 60, 62, 64, 66, 68 and 70 of the optical element arrangement 22 are enclosed by virtue of a modular cage system 80 so as to minimize coupling of any ambient light surrounding the optical element arrangement 22 to the output optical fiber 26a with the light collected from the sample 4. In reality, the optical element arrangement 22 further includes folding mirrors 82 and 84 to reduce the overall size of the optical element arrangement 22 and thereby provide a more compact Raman system 2. The objective lens 66 takes the form of Fresnel lens to reduce the overall size of the optical element arrangement 22. In addition, the optical element arrangement 22 includes a sample holder assembly generally designated 85 for holding the vial 6 relative to the optical element arrangement 22. The sample holder assembly 85 includes a Z-axis translation stage 86 for adjusting the separation between the vial 6 and the Fresnel lens 66. In addition, the sample holder assembly 85 includes a vial holder 87 attached to the Z-axis translation stage 86. The vial holder 87 defines a recess 88 which receives the vial 6. The vial 6 is held in place within the recess 88 by a grub screw 89.

As shown in FIG. 1B, an external optical source 8a may be optically coupled to the sample 4 using a second input optical fiber 24b having an optical fiber connector 38 by disconnecting the optical fiber connector 38 of the first input optical fiber 24a from the input optical port 32 and connecting the optical fiber connector 38 of the second input optical fiber 24b to the input optical port 32. The external optical source 8a may, for example, be larger, less portable and more powerful than the laser diode 8. The external optical source 8a may be capable of delivering a beam with a superior spatial profile to a spatial profile of a beam delivered by the laser diode 8. The external optical source 8a may have a lower linewidth than the laser diode 8. The external optical source 8a may comprise a laser. The external optical source 8a may be tuneable. The external optical source 8a may be configured for modulation of the wavelength of the light delivered from the external optical source 8a. Tuning or modulating the wavelength of the light delivered from the external optical source 8a may permit the measurement of different Raman spectra for different excitation wavelengths. The different excitation wavelengths may differ by up to 1 nm or more. One of ordinary skill in the art will understand that the different Raman spectra may be post-processed so as to remove the background fluorescence. The external optical source 8a may comprise a laboratory laser instrument. The external optical source 8a may comprise a titanium-sapphire (Ti:sapphire) laser. The external optical source 8a may be capable of generating green light. The external optical source 8a may be selected according to the technical application or the intended field of use.

Similarly, as shown in FIG. 1B, an external spectrometer 10a may be optically coupled to the sample 4 using a second output optical fiber 26b having an optical fiber connector 38 by disconnecting the optical fiber connector 38 of the first output optical fiber 26a from the output optical port 34 and connecting the optical fiber connector 38 of the second output optical fiber 26b to the output optical port 34. The external spectrometer 10a may, for example, be larger, less portable, be more sensitive and have a higher resolution than the spectrometer 10. The external spectrometer 10a may comprise at least one of a moveable dispersive element, a tuneable filter and a tuneable Fabry-Perot cavity. The external spectrometer 10a may comprise at least one of a photomultiplier tube, a photon counter, and an avalanche photodiode. The external spectrometer 10a may comprise a monochromator. The external spectrometer 10a may be selected according to the technical application or the intended field of use.

One of ordinary skill in the art will appreciate that the external optical source 8a may be used instead of the laser diode 8 and/or the external spectrometer 10a may be used instead of the spectrometer 10 without requiring any changes to be made to the optical element arrangement 22.

As described in more detail below, the particular configuration of the vial 5 shown in FIGS. 2 and 3 is also particularly advantageous for spectral measurements such as Raman spectral measurements. The vial 5 includes an outer body 6 and an inner receptacle 7 for receiving the sample 4, wherein the inner receptacle 7 is defined within, and is integral with, the outer body 6. The vial 5 further includes a screw-on lid 9. The outer body 6 has a fixed geometry, whereas the geometry of the inner receptacle 7 is configured according to a geometry and/or volume of the sample 4, subject to the constraints imposed by the fixed geometry of the outer body 6. The fixed geometry of the outer body 6 is selected according to a standard vial form-factor. For example, the fixed geometry of the outer body 6 is selected according to a standard vial form-factor for a vial having a fluid capacity of 2 ml. The fluid capacity of the inner receptacle 7 may, however, be significantly less than the fluid capacity of a standard vial form-factor. For example, the inner receptacle 7 may have a fluid capacity of 100 µl. Such a vial 5 may permit a spectral measurement such as a Raman spectral measurement to be performed on a smaller volume of fluid whilst retaining a standard vial form-factor.

Figure 4:
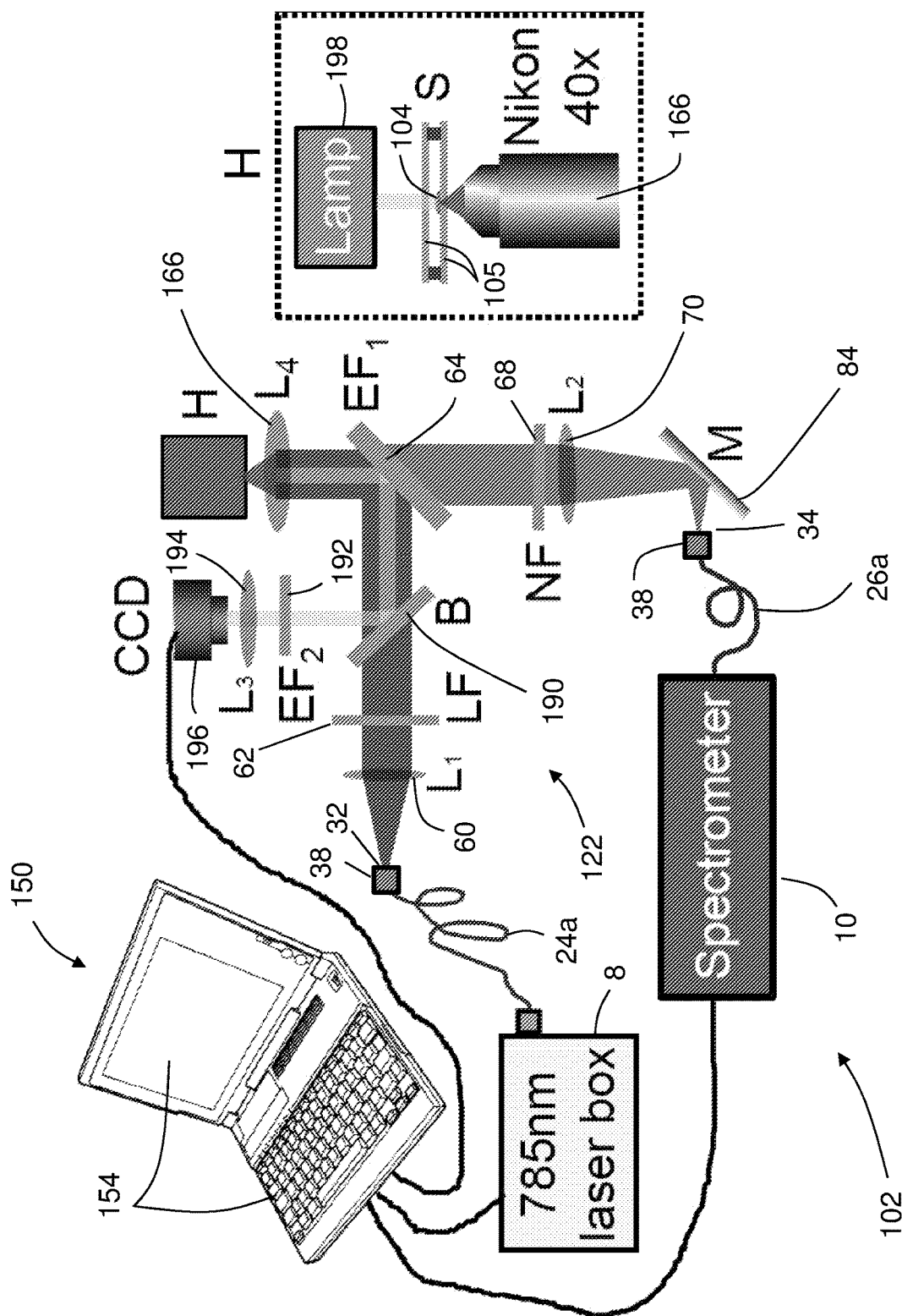
FIG. 4 schematically illustrates a first alternative Raman system for performing Raman spectroscopy on a sample when the Raman system is configured to use an internal optical source and an internal spectrometer.

FIG. 4 shows a first alternative Raman system generally designated 102 for performing Raman spectroscopy on a sample 104 held by a sample holder which includes two microscope slides 105. The sample 104 may, for example, include one or more particles or cells suspended within a liquid. The Raman system 102 includes many of the same features as the Raman system 2 described above with reference to FIGS. 1A, 1B, 2 and 3. The same features are represented using the same reference numerals. The Raman system 102 includes an alternative optical element arrangement generally designated 122 for coupling light from the input optical fiber 24a to the sample 104 and for collecting light from the sample 104 and coupling the collected light to the output optical fiber 26a. In addition, rather than including an internal controller, the Raman system 102 is configured for communication with an external controller 150 having a user interface 154 for receiving instructions from a user and/or for displaying information to a user.

In addition to having many of the same features of the optical element arrangement 22 of the Raman system 2, the alternative optical element arrangement 122 includes a 50:50 beam splitter 190, a low-pass edge filter 192, a lens 194 and a CCD image sensor 196. In addition, rather than including the Fresnel lens 66, the alternative optical element arrangement 122 includes a microscope objective lens 166 for coupling light from the laser source 8 to the sample 104 and for collecting light from the sample 104. The alternative optical element arrangement 122 further includes a lamp 198 for illuminating the sample 104.

Figure 5:
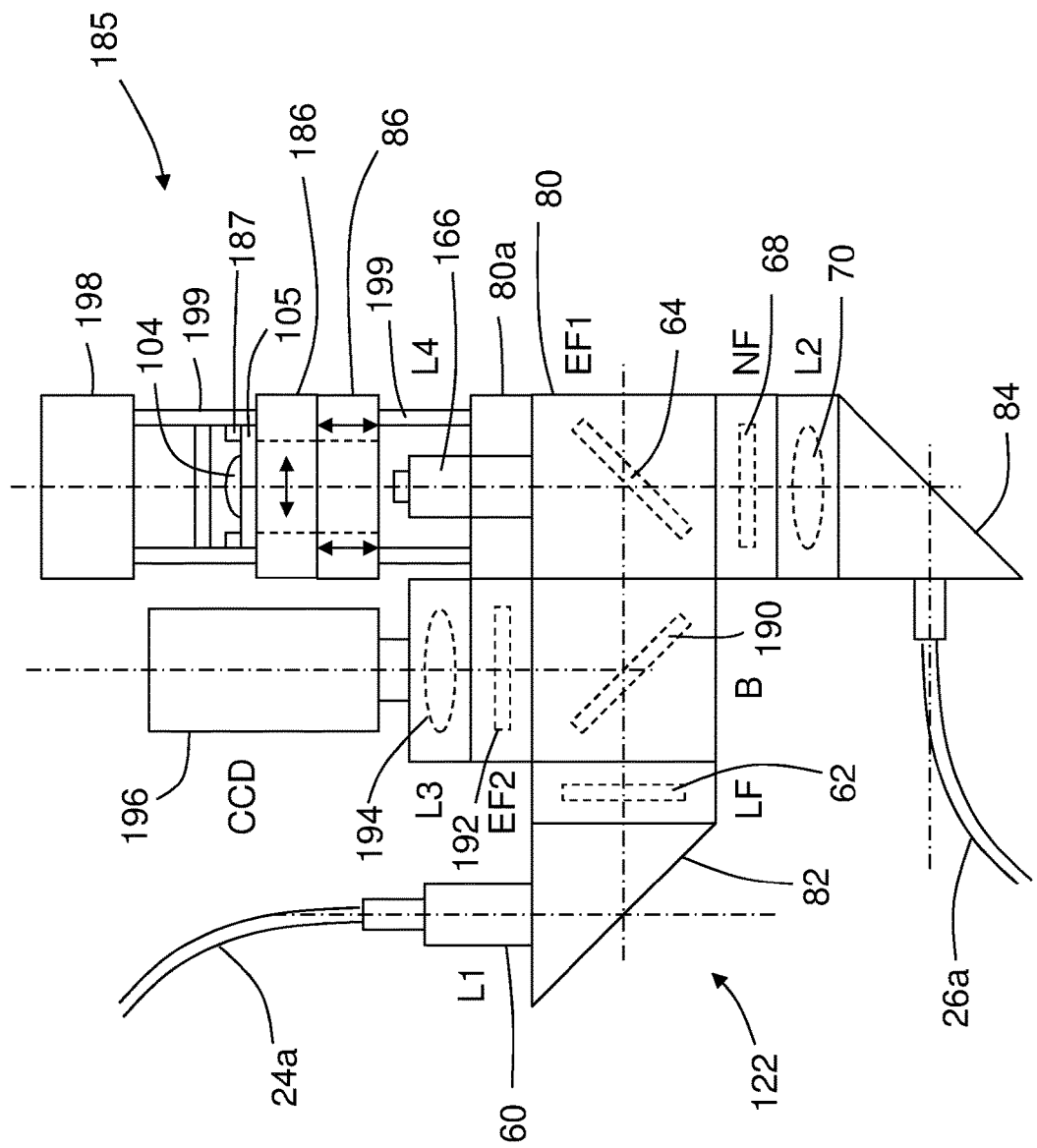
FIG. 5 shows a physical arrangement of part of an optical system of the first alternative Raman system of FIG. 4.

FIG. 5 shows a more accurate representation of the actual physical arrangement of the optical components of the alternative optical element arrangement 122. As shown in FIG. 5, all of the optical components 60, 62, 64, 66, 68 and 70 of the alternative optical element arrangement 122 are enclosed by virtue of a modular cage system 80 so as to minimize coupling of any ambient light surrounding the alternative optical element arrangement 122 to the output optical fiber 26a with the light collected from the sample 104. The alternative optical element arrangement 122 includes a sample holder assembly generally designated 185 for holding the microscope slides 105 relative to the alternative optical element arrangement 122. The sample holder assembly 185 includes the Z-axis translation stage 86 for adjusting the separation between the microscope slides 105 and the microscope objective 166 and an XY-axis translation stage 186 for adjusting the lateral alignment of the microscope slides 105 relative to the microscope objective 166. In addition, the sample holder assembly 185 includes one or more microscope slide holders 187 attached to the XY-axis translation stage 186. The microscope slide holders 187 may, for example, take the form of spring clips or the like for securing the microscope slides 105 to the XY-axis translation stage 186. As shown in FIG. 5, the translation stages 86, 186, and the lamp 198 may be secured to the alternative optical element arrangement 122 using one or more posts 199.

The alternative optical element arrangement 122 not only facilitates Raman and fluorescence measurements but may also be used to optically trap and/or control the position of one or more particles, cells or the like suspended within the liquid sample 104. In use, light from the lamp 198 illuminates the sample 104 and the sample 104 is imaged onto the CCD image sensor 196. One or more images are captured by the CCD image sensor and transferred to the controller 150 to permit a user to view the sample under high magnification.

In use, the laser diode 8 is operated CW so as to deliver optical power levels in the range 1-10 mW at or around 785 nm to optically trap a particle, cell or the like of the sample 104. The use of such optical power levels for optical trapping and/or positioning of the particles/cells may reduce photochemical and/or thermal damage to the particles/cells suspended within the liquid sample 104 during optical trapping and/or positioning. Once the particle/cell has been trapped and/or positioned, the laser diode 8 is operated CW so as to deliver optical power levels of the order of 100 mW at or around 785 nm for a time period of the order of 1-2 s for the measurement of a Raman spectrum and/or the background fluorescence in much the same way as previously described for the Raman system 2 with reference to FIGS. 1A, 1B, 2 and 3. A further optical source (not shown in FIG. 4 or 5) may be used to perform optical trapping of the particle/cell of the sample 104 and/or to perform Raman spectroscopy according to the technical application. Switching between the laser diode 8 and the further optical source (not shown in FIG. 4 or 5) may be simply accomplished by virtue of optical fiber connectors 38 at the input optical port 32 in the same way as previously described above for the Raman system 2 with reference to FIGS. 1A, 1B, 2 and 3.

Figure 6:
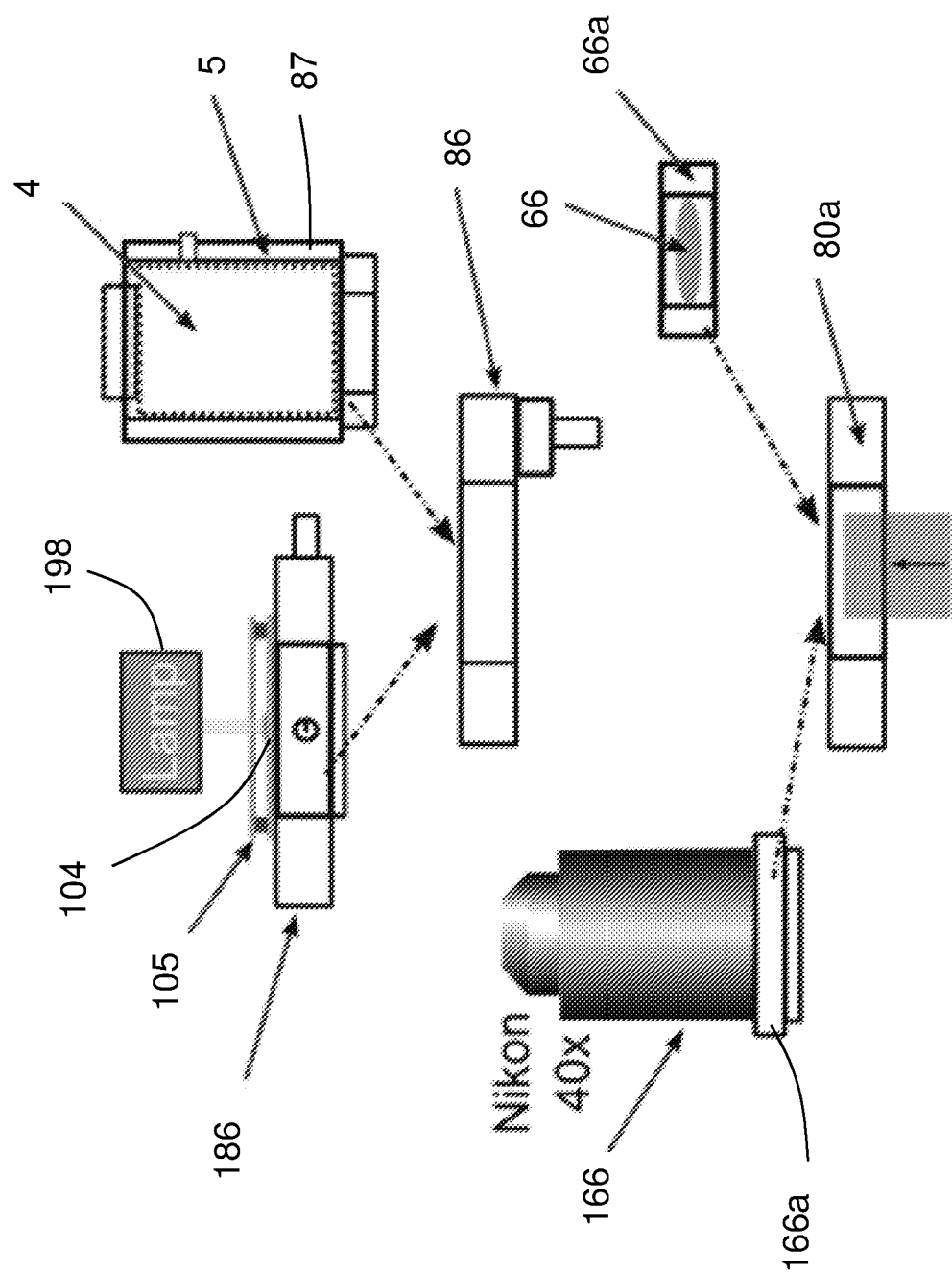
FIG. 6 illustrates a method of reconfiguring a sample holder assembly for use with the Raman system of FIGS. 1A, 1B and 2 or for use with the alternative Raman system of FIG. 4 according to the type of sample to be measured.

As illustrated in FIG. 6, the alternative optical element arrangement 122 is easily reconfigured for use with the sample 4 contained within the vial 5. The Fresnel lens 66 is mounted within a lens holder 66a which may be screw coupled to a cage element 80a for attachment to the cage 80 of the alternative optical element arrangement 122. Similarly, the microscope objective 166 is attached to an adapter 166a which may be screw coupled to the cage element 80a for attachment to the cage 80 of the optical element arrangement 22.

FIG. 7A shows a second alternative Raman system 202 for performing Raman spectroscopy on a sample 4. The Raman system 202 includes many of the same features as the Raman system 2 described above with reference to FIGS. 1A, 1B, 2 and 3. The same features are represented using the same reference numerals. The Raman system 202 includes an optical system 220 for coupling light from the laser diode 8 to the sample 4 and for collecting light from the sample 4 and optically coupling the collected light to the spectrometer 10.

The optical system 220 includes a further output optical port 33 which is optically coupled to the laser diode 8 and a further input optical port 35 which is optically coupled to the spectrometer 10.

The optical system 220 includes a first input optical fiber 24c for coupling light from the further output optical port 33 to the input optical port 32. The first input optical fiber 24c includes an SMA optical fiber connector 38 for connection of the first input optical fiber 24c to the further output optical port 33.

The optical system 220 includes a first output optical fiber 26c for coupling light from the output optical port 34 to the further input optical port 35. The first output optical fiber 26c includes an SMA optical fiber connector 38 at one end for connection of the first output optical fiber 24c to the further input optical port 35.

As shown in FIG. 7B, an external optical source 8a may be optically coupled to the sample 4 using the input optical fiber 24c by disconnecting the optical fiber connector 38 from the further output optical port 33 and connecting the optical fiber connector 38 to the external optical source 8a. Similarly, as shown in FIG. 7B, an external spectrometer 10a may be optically coupled to the sample 4 using the output optical fiber 26c by disconnecting the optical fiber connector 38 from the further input optical port 35 and connecting the optical fiber connector 38 to the external spectrometer 10a.

In a variant of the Raman system 202, the first input optical fiber 24c may additionally include an SMA optical fiber connector 38 for connection of the first input optical fiber 24c to the input optical port 32. In such a variant, the first input optical fiber 24c may be disconnected from both the further output optical port 33 and the input optical port 32 to permit the external optical source 8a to be connected to the input optical port 32 using a further input optical fiber (not shown). In a further variant of the Raman system 202, the first output optical fiber 26c may include an SMA optical fiber connector 38 for connection of the first output optical fiber 24c to the output optical port 34. In such a further variant, the first output optical fiber 24c may be disconnected from both the output optical port 34 and the further input optical port 35 to permit the output optical port 34 to be connected to the external spectrometer 10a using a further output optical fiber (not shown).

Figure 8:
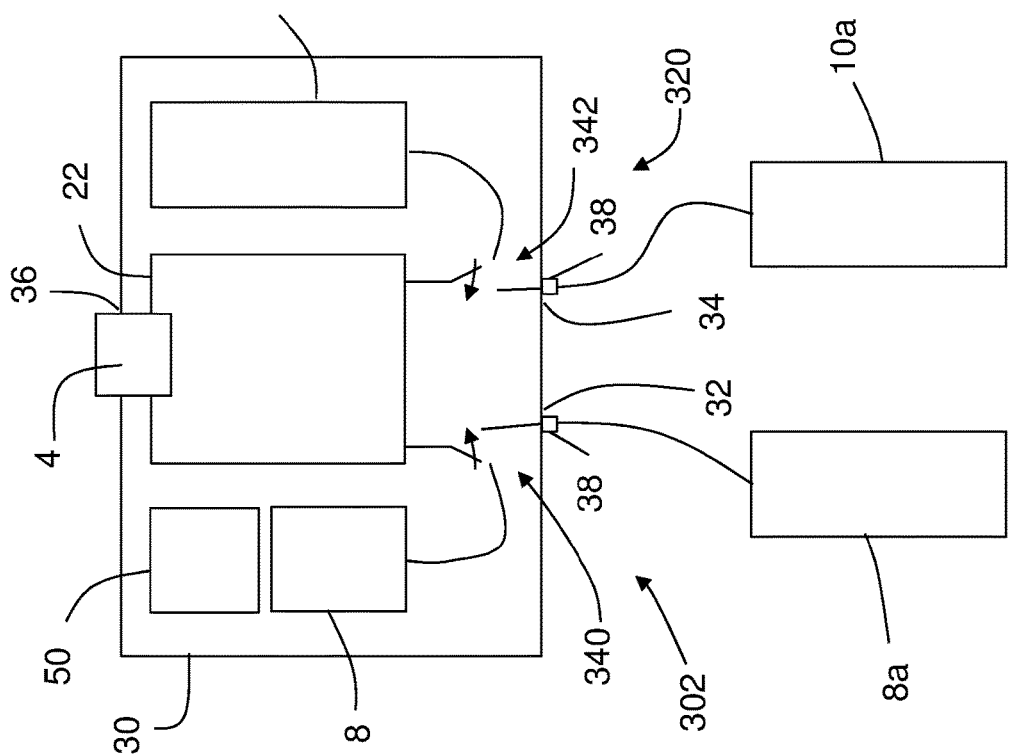
FIG. 8 shows a third alternative Raman system for performing Raman spectroscopy on a sample.

FIG. 8 shows a third alternative Raman system 302 for performing Raman spectroscopy on a sample 4. The Raman system 302 includes many of the same features as the Raman system 2 described above with reference to FIGS. 1A, 1B, 2 and 3. The same features are represented using the same reference numerals. The Raman system 302 includes an optical system 320 for coupling light from the laser diode 8 to the sample 4 and for collecting light from the sample 4 and optically coupling the collected light to the spectrometer 10. The optical system 320 includes an input optical switch 340 having a first optical switch input port optically coupled to the laser diode 8, a second optical switch input port optically coupled to the input optical port 32 for receiving light from a further optical source 8a and an optical switch output port optically coupled to the optical element arrangement 22 for coupling light in a direction towards the sample 4. The optical system 320 further includes an output optical switch 342 having an optical switch input port optically coupled to the optical element arrangement 22 for coupling light in a direction away the sample 4, a first optical switch output port optically coupled to the spectrometer 10, and a second optical switch output port optically coupled to the output optical port 38 for transmitting light to the further spectrometer 10a.

In use, the input optical switch 340 may be operated to switch between the laser diode 8 and the further optical source 8a according to the technical application without any requirement to disconnect and connect any optical fiber connectors. Similarly, the output optical switch 342 may be operated to switch between the spectrometer 10 and the further spectrometer 10a according to the technical application without any requirement to disconnect and connect any optical fiber connectors. One of ordinary skill in the art should understand that the input and output optical switches 340, 342 may have optical fiber inputs and outputs. The input and output optical switches 340, 342 may include or may be implemented using at least one of a bulk optical element, an optical fiber element and an integrated optical waveguide element.

Figure 9:
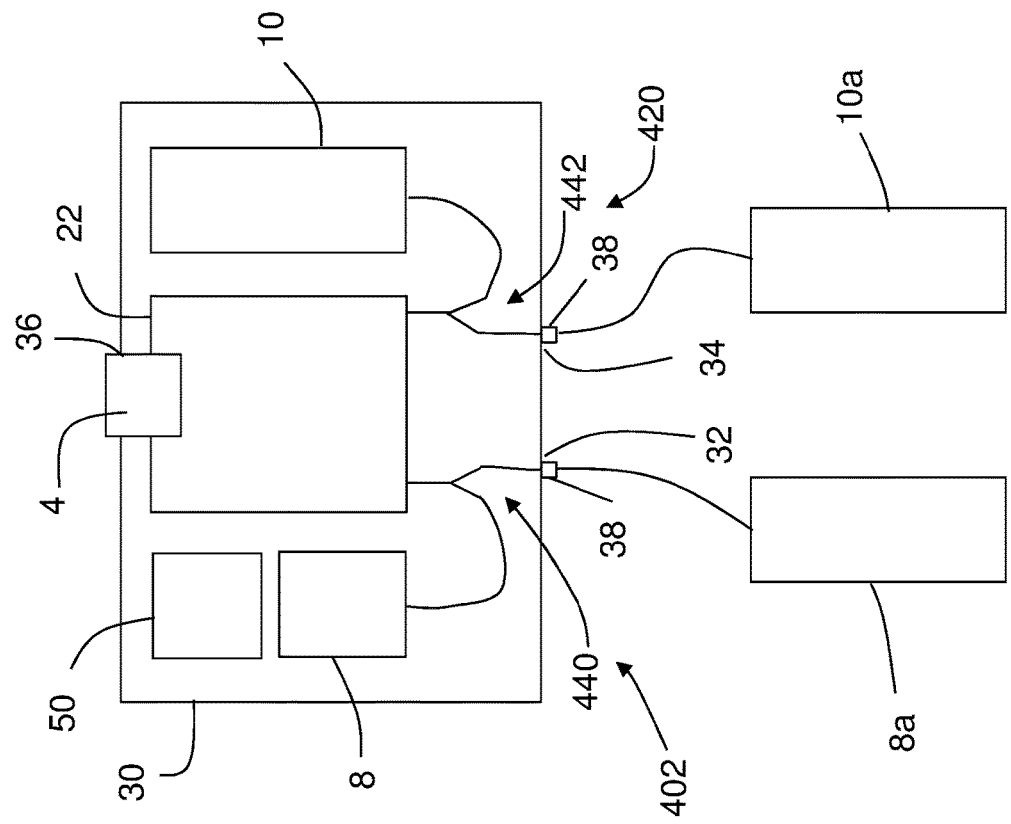
FIG. 9 shows a fourth alternative Raman system for performing Raman spectroscopy on a sample.

FIG. 9 shows a fourth alternative Raman system 402 for performing Raman spectroscopy on a sample 4. The Raman system 402 includes many of the same features as the Raman system 2 described above with reference to FIGS. 1A, 1B, 2 and 3. The same features are represented using the same reference numerals. The Raman system 402 includes an optical system 420 for coupling light from the laser diode 8 to the sample 4 and for collecting light from the sample 4 and optically coupling the collected light to the spectrometer 10. The optical system 420 includes an input optical coupler or optical beam combiner 440 having a first optical coupler input port optically coupled to the laser diode 8, a second optical coupler input port optically coupled to the input optical port 32 for receiving light from a further optical source 8a and an optical coupler output port optically coupled to the optical element arrangement 22 for coupling light in a direction towards the sample 4. The optical system 420 further includes an output optical coupler or optical beam splitter 442 having an optical coupler input port optically coupled to the optical element arrangement 22 for coupling light in a direction away the sample 4, a first optical coupler output port optically coupled to the spectrometer 10, and a second optical coupler output port optically coupled to the output optical port 38 for transmitting light to a further spectrometer 10a.

In use, the input optical coupler 440 simultaneously couples light from both the laser diode 8 and the further optical source 8a towards the sample 4 without any requirement to disconnect and connect any optical fiber connectors. Similarly, in use, the output optical coupler 442 simultaneously couples Raman scattered light emitted from the sample 4 to both the spectrometer 10 and the further spectrometer 10a without any requirement to disconnect and connect any optical fiber connectors. One of ordinary skill in the art should understand that the input and output optical couplers 440, 442 may have optical fiber inputs and outputs. The input and output optical couplers 440, 442 may include or may be implemented using at least one of a bulk optical element, an optical fiber element and an integrated optical waveguide element.

One of ordinary skill in the art will appreciate that various modifications may be made to the apparatus and methods described above. For example, any of the input optical fibers 24a, 24b, 24c may be a single-mode fiber (SMF), a multi-mode fiber MMF, or any other kind of optical fiber. Any of the output optical fibers 26a, 26b, 26c may be a multi-mode fiber MMF.

The Raman system 2, 102, 202, 302, 402 may include a temperature sensor for measuring a temperature of the sample 4, 104 or a temperature of the ambient environment. The temperature sensor may be configured for communication with the controller 50, 150. The controller 50, 150 may store one or more measured temperature values received from the temperature sensor. The controller 50, 150 may use a measured temperature value received from the temperature sensor when comparing measured spectral data received from the spectrometer 10 with stored spectral data obtained from known substances.

The Raman system 2, 102, 202, 302, 402 may include any kind of optical source including any kind of laser source operating at an appropriate wavelength such as a near-infrared wavelength. The optical source may comprise a laser diode. The optical source may operate at or around a wavelength of 785 nm or at or around a wavelength of 833 nm. The optical source may be may operable CW. The optical source may be capable of delivering optical powers of up to a few hundred mW. The optical source may be capable of delivering optical powers of the order of 1-10 mW for optical trapping and of delivering optical powers of the order of 100-200 mW for Raman measurements. The optical source may be capable of delivering optical powers of the order of 100-200 mW for time periods of the order of 1-2 s for Raman measurements. The optical source may be tuneable and/or may be capable of modulating the wavelength of the light delivered from the optical source. Tuning or modulating the wavelength of the light delivered from the optical source may permit the measurement of different Raman spectra for different excitation wavelengths. The different excitation wavelengths may differ by up to 1 nm or more. One of ordinary skill in the art will understand that the different Raman spectra may be post-processed so as to remove background fluorescence.

The invention claimed is:

1. A Raman system for use in performing Raman spectroscopy on a sample, the Raman system comprising:
an optical source for generating light for exciting Raman scattered light in the sample;
a spectrometer for measuring a spectrum of the Raman scattered light;
an optical system for coupling light from the optical source to the sample and for coupling light, including the Raman scattered light, from the sample to the spectrometer and for coupling light, including the Raman scattered light, from the sample to a further spectrometer for measuring the spectrum of the Raman scattered light;
a housing for housing the optical source and the spectrometer but not the further spectrometer, wherein the housing defines an aperture for receiving the sample and/or the housing defines one or more windows for coupling light to and from the sample; and
an output optical port comprised in the housing and configured to allow light from the sample, including the Raman scattered light, to leave the housing and to propagate towards the spectrometer or the further spectrometer,
wherein the optical system comprises one or more optical elements within the housing for optically coupling light from the sample to the output optical port.

2. A Raman system according to claim 1, wherein the optical system is configured to couple light, including the Raman scattered light, from the sample to the spectrometer and to couple light, including the Raman scattered light, to the further spectrometer at different times.

3. A Raman system according to claim 1, wherein the optical system is configured to optically couple the output optical port to the spectrometer and to optically couple the output optical port to the further spectrometer at different times.

4. A Raman system according to claim 1, wherein the optical system comprises an output optical fiber for optically coupling the output optical port to the spectrometer and/or for optically coupling the output optical port to the further spectrometer.

5. A Raman system according to claim 1, wherein the optical system comprises an output optical switch having an optical switch input port, a first optical switch output port, and a second optical switch output port and, wherein the sample is optically coupled to the optical switch input port, the first optical switch output port is optically coupled to the spectrometer and the second optical switch output port is configured to be optically coupled to the further spectrometer.

6. A Raman system according to claim 1, wherein the optical system is configured for coupling light from a further optical source to the sample.

7. A Raman system according to claim 6, wherein the optical system is configured to couple light from the optical source to the sample and from the further optical source to the sample at different times.

8. A Raman system according to claim 6, comprising:
an input optical port,
wherein the optical system is configured to optically couple the optical source to the input optical port, the further optical source to the input optical port, and the input optical port to the sample.

9. A Raman system according to claim 8, wherein the optical system is configured to optically couples the optical source to the input optical port and the further optical source to the input optical port at different times.

10. A Raman system according to claim 8, wherein the optical system comprises an input optical fiber for optically coupling the optical source to the input optical port and/or for optically coupling the further optical source to the input optical port.

11. A Raman system according to claim 8, wherein the optical system comprises an input optical switch having a first optical switch input port, a second optical switch input port and an optical switch output port and, wherein the optical source is optically coupled to the first optical switch input port, the second optical switch input port is configured to be optically coupled to the further optical source and the optical switch output port is optically coupled to the sample.

12. A Raman system according to claim 1, wherein the optical system is configured to optically couple the output optical port to the spectrometer at a first time and to optically couple the output optical port to the further spectrometer at a second time without requiring any changes to be made to the one or more optical elements.

13. A Raman system for use in performing Raman spectroscopy on a sample, the Raman system comprising:
an optical source configured to generate light for exciting Raman scattered light in the sample;
a spectrometer configured to measure a spectrum of the Raman scattered light;
an optical system configured for coupling light from the optical source to the sample, for coupling light from a further optical source to the sample, and for coupling light, including the Raman scattered light, from the sample to the spectrometer, the further optical source being configured to generate light for exciting Raman scattered light in the sample;
a housing for housing the optical source and the spectrometer but not the further optical source, wherein the housing defines an aperture for receiving the sample and/or the housing defines one or more windows for coupling light to and from the sample; and
an input optical port comprised in the housing and configured to allow light from the optical source or the further optical source to enter the housing and to propagate towards the sample,
wherein the optical system comprises one or more optical elements within the housing for optically coupling light from the input optical port to the sample.

14. A Raman system according to claim 13, wherein the optical system is configured to couple light from the optical source to the sample and from the further optical source to the sample at different times.

15. A Raman system according to claim 13, wherein the optical system is configured to optically couple the optical source to the input optical port and to optically couple the further optical source to the input optical port at different times.

16. A Raman system according to claim 13, wherein the optical system comprises an input optical fiber for optically coupling the optical source to the input optical port and/or for optically coupling the further optical source to the input optical port.

17. A Raman system according to claim 13, wherein the optical system comprises an input optical switch having a first optical switch input port, a second optical switch input port and an optical switch output port and, wherein the optical source is optically coupled to the first optical switch input port, the second optical switch input port is configured to be optically coupled to the further optical source and the optical switch output port is optically coupled to the sample.

18. A Raman system according to claim 13, wherein the optical system is configured for coupling light from the sample to a further spectrometer.

19. A Raman system according to claim 18, wherein the optical system is configured to couple light, including the Raman scattered light, from the sample to the spectrometer and to couple light, including the Raman scattered light, from the sample to the further spectrometer at different times.

20. A Raman system according to claim 18, comprising:
an output optical port,
wherein the optical system is configured to optically couple the sample to the output optical port, the output optical port to the spectrometer, and the output optical port to the further spectrometer.

21. A Raman system according to claim 20, wherein the optical system is configured to optically couple the output optical port to the spectrometer and the output optical port to the further spectrometer at different times.

22. A Raman system according to claim 20, wherein the optical system comprises an output optical fiber for optically coupling the output optical port to the spectrometer and/or for optically coupling the output optical port to the further spectrometer.

23. A Raman system according to claim 20, wherein the optical system comprises an output optical switch having an optical switch input port, a first optical switch output port, and a second optical switch output port and, wherein the sample is optically coupled to the optical switch input port, the first optical switch output port is optically coupled to the spectrometer and the second optical switch output port is configured to be optically coupled to the further spectrometer.

24. A Raman system according to claim 13, wherein the optical system is configured to optically couple the optical source to the input optical port at a first time and to optically couple the further optical source to the input optical port at a second time without requiring any changes to be made to the one or more optical elements.

\* \* \* \* \*